United States Patent  
Matsumoto et al.

(10) Patent No.: US 12,294,255 B2
(45) Date of Patent: May 6, 2025

(54) COIL FORMING APPARATUS AND COIL FORMING METHOD

(71) Applicant: HONDA MOTOR CO., LTD., Tokyo (JP)

(72) Inventors: Yutaka Matsumoto, Tokyo (JP); Shuhei Okuda, Tokyo (JP); Eishi Yoshida, Tokyo (JP); Junya Ochiai, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 316 days.

(21) Appl. No.: 18/053,753

(22) Filed: Nov. 9, 2022

(65) Prior Publication Data

US 2023/0143083 A1 May 11, 2023

(30) Foreign Application Priority Data

Nov. 11, 2021 (JP) .................................. 2021-184359

(51) Int. Cl.
*H02K 3/28* (2006.01)
*H02K 15/048* (2025.01)

(52) U.S. Cl.
CPC ........... *H02K 15/0485* (2013.01); *H02K 3/28* (2013.01)

(58) Field of Classification Search
CPC ........... H02K 15/0435; H02K 15/0478; H02K 15/0485; H02K 15/065; H02K 3/28; H02K 15/043; H02K 15/0433
See application file for complete search history.

(56) References Cited

U.S. PATENT DOCUMENTS

| | | | | |
|---|---|---|---|---|
| 7,281,312 B2 * | 10/2007 | Sadiku | ............... | H02K 15/0478 29/598 |
| 8,096,046 B2 * | 1/2012 | Shives | ................. | H02K 15/064 29/736 |
| 8,166,628 B2 * | 5/2012 | Akimoto | ............ | H02K 15/0421 29/603.24 |
| 10,992,211 B2 * | 4/2021 | Sadiku | .................... | B21C 47/02 |

(Continued)

FOREIGN PATENT DOCUMENTS

JP 4953032 B2 6/2012

OTHER PUBLICATIONS

JP 2004-312946A, Haga et al. Nov. 2004.*

*Primary Examiner* — Edward T Tolan
(74) *Attorney, Agent, or Firm* — CKC & Partners Co., LLC

(57) ABSTRACT

A coil molding apparatus being capable of easily forming the band-shaped coil into a wound state, without the winding posture in the coil winding jig being disturbed by spring back of the band-shaped coil. The coil molding apparatus includes: a coil winding jig for winding the band-shaped coil with inserting straight portions thereof into a plurality of comb-shaped grooves in the outer periphery; a coil conveying mechanism unit for pivotally conveying the band-shaped coil along the outer periphery of the coil winding jig; and guide members for inserting the band-shaped coil into the plurality of comb-shaped grooves by guiding in an arc shape while contacting with the side end of the band shaped groove thereby gradually reducing in diameter accompanying pivoting at a second half portion of pivot conveying of the band-shaped coil, then extending with maintaining curvature of the portion of which the diameter has already been reduced.

4 Claims, 12 Drawing Sheets

(56) References Cited

U.S. PATENT DOCUMENTS

| | | | |
|---|---|---|---|
| 11,569,716 B2 * | 1/2023 | Okuda | H02K 15/0435 |
| 11,735,984 B2 * | 8/2023 | Yoshida | H02K 15/0478 |
| | | | 29/596 |
| 11,967,457 B2 * | 4/2024 | Yoshida | H02K 15/04 |
| 2011/0000078 A1 | 1/2011 | Gorohata et al. | |
| 2014/0196282 A1 * | 7/2014 | Stephenson | H02K 15/064 |
| | | | 29/732 |
| 2023/0141937 A1 * | 5/2023 | Ochiai | H02K 15/0478 |
| | | | 29/732 |
| 2023/0145534 A1 * | 5/2023 | Yoshida | H02K 3/28 |
| | | | 140/71 R |

* cited by examiner

COIL FORMING APPARATUS AND COIL FORMING METHOD

This application is based on and claims the benefit of priority from Japanese Patent Application No. 2021-184359, filed on 11 Nov. 2021, the content of which is incorporated herein by reference.

BACKGROUND OF THE INVENTION

Field of the Invention

The present invention relates to a coil forming apparatus and a coil forming method.

Related Art

The stator of a rotary electric machine has a band-shaped coil in a wound state. The band-shaped coil is formed in advance in a substantially cylindrical wound state having a smaller diameter than the inside diameter of the stator core, and is inserted inside of the stator core. The band-shaped coil in the wound state is expanded in diameter inside of the stator coil, and is mounted by inserting the straight portion of the band-shaped coil into a slot of the stator core.

Conventionally, it has been known to mold the band-shaped coil into a wound state of substantially cylindrical shape by winding on a coil winding jig, while feeding by one pitch at a time on the columnar coil winding jig (for example, refer to Patent Document 1),
Patent Document 1: Japanese Patent No. 4953032

SUMMARY OF THE INVENTION

When forming the coil into the wound state by winding the coil, it is important that a plurality of straight portions are wound accurately without displacing. In the above prior art, by inserting a preliminary alignment member between adjacent straight portions in a position immediately preceding the coil winding jig on the conveying path of the band-shaped coil, the superposition of the immediately preceding straight portion to be wound in the coil winding jig is aligned.

However, in the above prior art, there is no specific disclosure of how the coil winding jig is configured to wind the band-shaped coil, and the problem of the winding posture in the coil winding jig being disturbed by spring back of the band-shaped coil is not mentioned therein. If the winding posture of the band-shaped coil is disturbed, it will lead to poor quality. A decline in yield due to poor quality leads to material loss and an increase in electrical consumption due to lengthening the equipment operating time.

The present invention has been made taking account of the aforementioned such situation, and has an object of providing a coil forming apparatus and a coil forming method capable of easily forming a band-shaped coil in a wound state, without, the winding posture in the coil winding jig being disturbed by spring back of the band-shaped coil. In addition, it is consequently an object of reduce the adverse effects on the global environment, by decreasing the material resources and energy cost.

A coil forming apparatus (for example, the coil forming apparatus 1 as described later) according to a first aspect of the present invention forms a band-shaped coil (for example, the band-shaped coil 100 described later) in a wound state, the band-shaped coil including a plurality of straight portions (for example, the straight portions 102 described later) and side ends (for example, the side ends 103 described later) provided on both ends of the plurality of straight portions, the coil forming apparatus including: a coil winding jig (for example, the coil winding jig 2 described later) that winds the band-shaped coil, the coil winding jig including a plurality of comb-shaped grooves (for example, the comb-shaped grooves 23 described later) on an outer periphery thereof, each of which can hold a respective one of the plurality of straight portions therein; a coil conveying mechanism (for example, the coil conveying mechanism unit 3 described later) that pivotally conveys the band-shaped coil along at least a portion of the outer periphery of the coil winding jig; and guide members (for example, the guide member 4 described later) that are provided in a vicinity of both ends of the coil winding jig in an axial direction, and guide the band-shaped coil in an arc shape to insert in a respective one of the plurality of comb-shaped grooves while being in contact with the side end, in which the guide members include a diameter-reducing guide part (for example, the diameter-reducing guide part 41r described later) provided to gradually reduce in diameter in a second half portion of pivot conveying of the band-shaped coil along a path of the pivot conveying, and an extension guide part (for example, the extension guide part 41m described later) which links to an end edge (for example, the end edge 4b described later) of the diameter-reducing guide part and extends a predetermined length by maintaining a diameter according to curvature of the end edge.

According to a second aspect of the present invention, in the coil forming apparatus as described in the first aspect, the extension guide part may have an extension length capable of abutting at least a pair of the straight portions linking to the same side end of the band-shaped coil.

A coil forming method according to a third aspect of the present invention forms a band-shaped coil (for example, the band-shaped coil 100 described later) in a wound state, the band-shaped coil including a plurality of straight portions (for example, the straight portions 102 described later) and side ends (for example, the side ends 103 described later) provided on both ends of the plurality of straight portions, the method including: a coil conveying step of pivotally conveying the banc-shaped coil along at least a portion of an outer periphery of a coil winding jig (for example, the coil winding jig 2 described later), the coil winding jig including a plurality of comb-shaped grooves (for example, the comb-shaped grooves 23 described later) on an outer periphery thereof, each of which can hold a respective one of the plurality of straight portions therein, and being configured to wind the band-shaped coil, and a guiding step of providing guide members (for example, the guide member 4 described later) in a vicinity of both ends of the coil winding jig in an axial direction, guiding the band-shaped coil so as to be in an arc shape while bringing the guide member into contact with the side end so as to insert into a respective one of the plurality of comb-shaped grooves, in which the guiding step includes: a diameter-reducing guide step of guiding the band-shaped coil so as to gradually reduce in diameter at a second half portion of the pivot conveying along a path of the pivot conveying, and an extension guide step, immediately following the diameter-reducing guide step, of guiding the band-shaped coil to extend a predetermined length by maintaining a diameter according to a curvature immediately following the diameter-reducing guide step.

According to a fourth aspect of the present invention, in the coil forming method as described in the third aspect, the extension guide step may maintain guidance over, an extension length capable of abutting at least a pair of the straight portions linking to the same side end of the band-shaped coil.

According to the coil forming apparatus as described in the first aspect, the band-shaped coil is gradually reduced in diameter by the diameter-reducing guide part at the second half portion of pivot conveying, and spring back is suppressed by the extension guide part linking to the end edge, even when reaching the end edge of the diameter-reducing guide part. For this reason, the winding posture being distorted in the coil winding jig by spring back of the band-shaped coil is avoided. In addition, consequently, by reducing material loss causing a decline in yield due to poor quality and an increase in electrical energy consumption due to lengthening the equipment operating time, it is possible to reduce the adverse effects on the global environment.

According to the coil forming apparatus as described in the second aspect, the extension guide part has the extension length capable of abutting at least a pair of the straight portions linking to the same side end of the band-shaped coil; therefore, spring back of the band-shaped coil is effectively inhibited.

According to the coil forming method as described in the third aspect, the guiding step of guiding the band-shaped coil in an arc shape to insert into a respective one of the comb teeth-shaped grooves includes the diameter-reducing guide step and the extension guide step. In other words, immediately after the diameter-reducing guide step of guiding the band-shaped coil so as to gradually reduce in diameter, it advances to the extension guide step immediately following of guiding by maintaining the diameter from the curvature to extend the band-shaped coil by a predetermined length. Therefore, spring back of the band-shaped coil is suppressed. For this reason, in the band-shaped coil, the winding posture being disturbed by spring back thereof is avoided.

According to the coil forming method as described in the fourth aspect, since guidance is maintained over the extension length capable of abutting at least the pair of straight portions linking to the same side end of the band-shaped ceil, spring back of the band-shaped coil is effectively inhibited.

In addition, the coil forming apparatus as described in the first and second aspects, and the coil forming method as described in the third and fourth aspects are collectively premised on using material made into a series of band-shaped coils in advance, as the coils set in the stator. Upon setting the coil into the slot of the stator, the current mainstream technique is a technique which divides and forms the coil into a plurality of segments, and after inserting into the slots, welds the coil ends. In this general technique, it is necessary to use high purity copper in the coil so as to be able to withstand the thermal processing at the weld location. In contrast, since coping with the thermal processing is unnecessary with the present invention, it is possible to use recycled copper wire containing impurities, which can contribute to the realization of the recycling of resources.

DETAILED DESCRIPTION OF THE INVENTION

Figure 1:
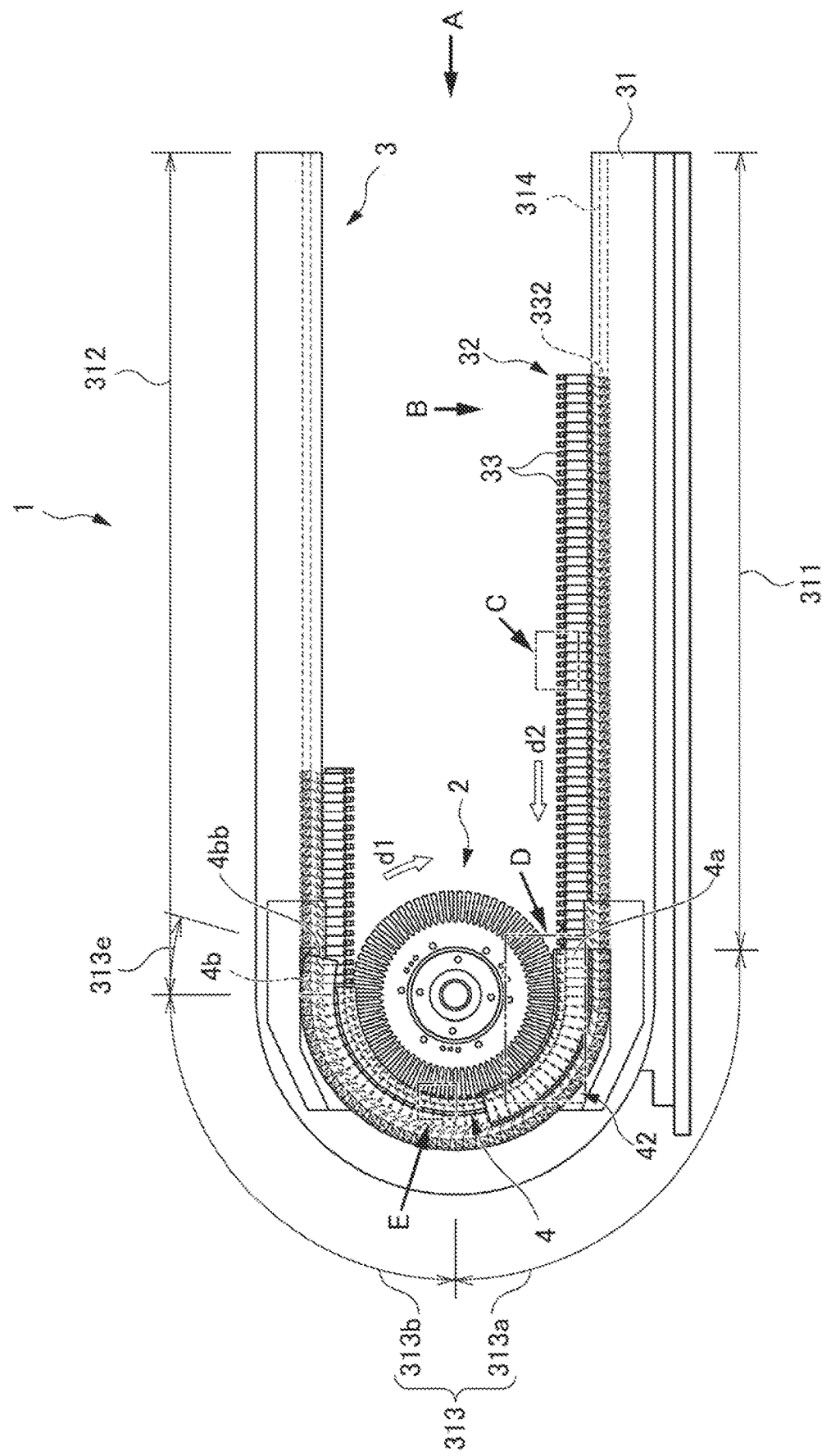
FIG. 1 is a side view showing an embodiment of a coil forming apparatus of the present invention.

Hereinafter, an embodiment of the present invention will be explained. As shown in FIG. 1, a coil forming apparatus 1 of the present embodiment includes: a coil winding jig 2; a coil conveying mechanism unit 3 which causes a hand-shaped coil 100 which is a so-called wave-winding band-shaped coil to convey along the outer circumference of the coil winding jig 2; and a pair of guide members A which guide the band-shaped coil 100 conveyed by the coil conveying mechanism unit 3 so as to be wound on the coil winding jig 2.

Band-shaped Coil

Figure 3:
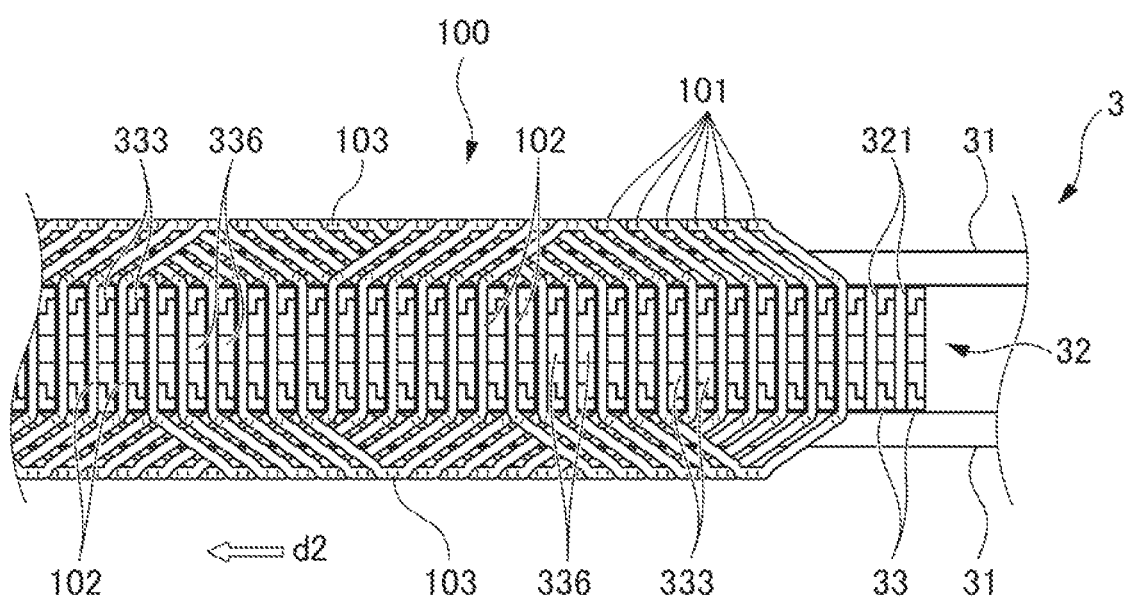
FIG. 3 is a drawing viewing the coil forming apparatus shown in FIG. 1 from the B direction in FIG. 1.

As shown in FIG. 3, the band-shaped coil 100 is molded into an elongated corrugated band-shape by rectangular conductor wires 101 having a substantially rectangular cross-sectional shape. The rectangular conductor wires 101 are formed from a metal having high conductivity such as copper or aluminum, for example.

The band-shaped coil 100 has a plurality of straight portions 102 and a plurality of side ends 103. The straight portions 102 are parts to be inserted in a slot provided in the inner circumference of a stator core which is not illustrated, and are arranged in parallel at a predetermined interval to extend substantially linearly in the same direction, respectively. The side ends 203 are respectively arranged at a position closer to the side end of the band-shaped coil 100 than the straight portion 102, i.e. at both ends in the extending direction of the straight portion 102. The side ends 103 couple adjacent straight portions 102 at one end portion and the other end portion alternately in a mountain shape, and constitute coil end parts, each projecting in an axial direction of the stator core from the stator, upon the band-shaped coil 100 being mounted to the stator of the stator core.

The band-shaped coil 100 of the present embodiment is provided in an elongated band shape by arranging six rectangular conductor wires 101 in a manner in which the plurality of straight portions 102 are provided in parallel to each other at a constant interval, and the plurality of side ends 103 are shifted by the pitch of the straight portions 102 to be stacked. The six rectangular conductor wires 101 are provided by folding the plurality of straight portions 102 and the plurality of side ends 103 respectively in a corrugated shape. The straight portions 102 of the band-shaped coil 100 are stacked in the thickness direction (the vertical direction relative to the paper plane of FIG. 3) of the band-shaped coil 100 by folding back the rectangular conductor wire 101 in the middle. The band-shaped coil 100 of the present embodiment has a length that is wound four times around the coil winding jig 2 to be described later.

Coil Winding Jig

Figure 4:
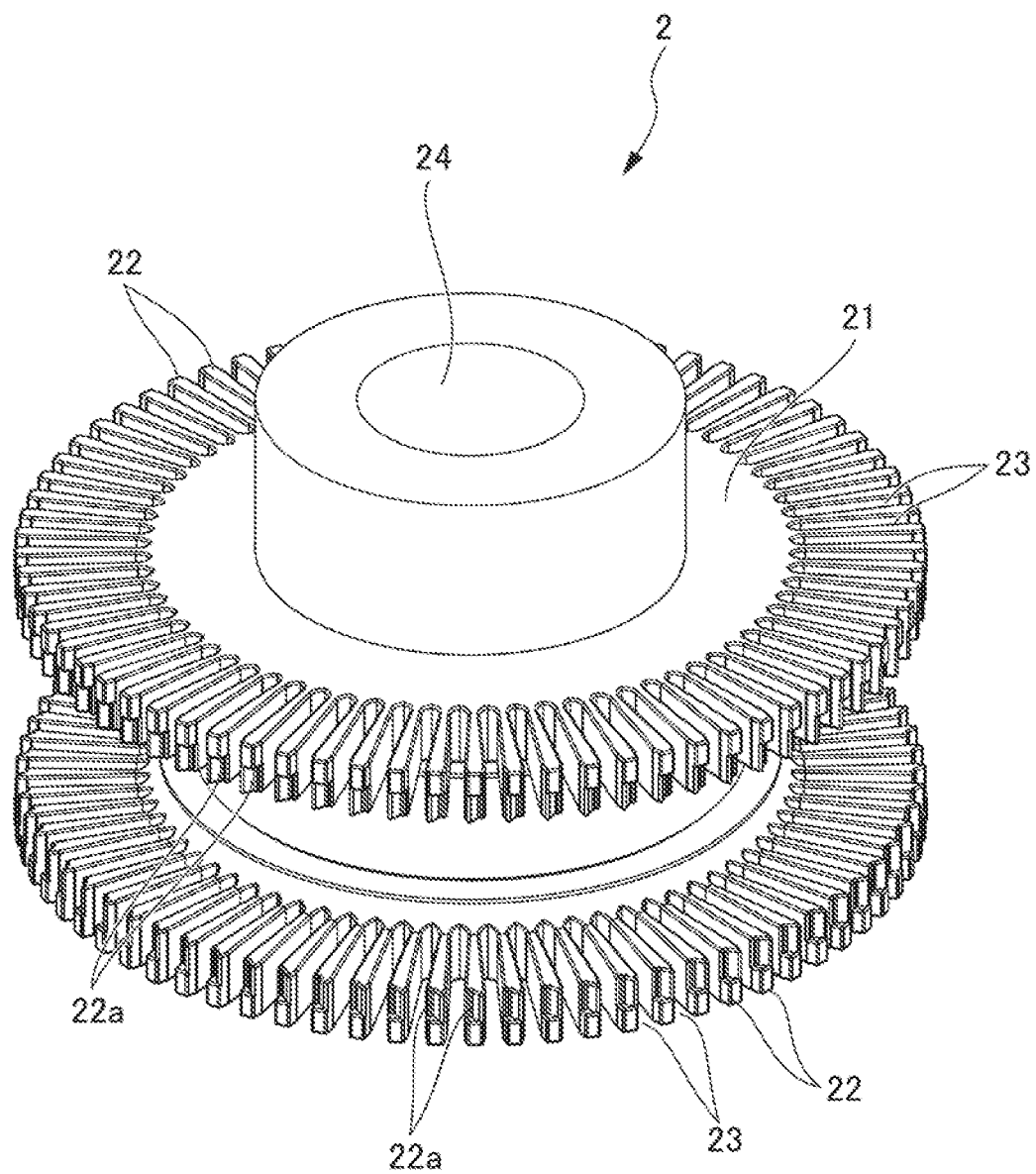
FIG. 4 is a perspective view showing an embodiment of a coil wincing jig.

As shown in FIG. 4, the coil winding jig 2 includes: a substantially cylindrical jig main body 21; a plurality of comb teeth 22 protruding radially to the outer circumference of the jig main body 21, a plurality of comb teeth-shaped grooves 23 provided between the adjacent comb teeth 22, 22 in the circumferential direction, and an axial hole 24 opened at the center of the jig main body 21. The comb teeth 22 and comb teeth-shaped groove 22 are respectively provided at both ends in the axial direction of the jig main body 21. The phases of the comb teeth 22 and comb teeth-shaped groove 23 at one end of the jig main body 21 and the comb teeth 22 and comb teeth-shaped groove 23 at the other end are aligned. The coil winding jig 2 of the present embodiment has 72 comb teeth-shaped grooves 23 respectively at both ends in the axial direction of the jig main body 21. The number of these comb teeth-shaped grooves 23 matches the number of slots in the stator core in which the band-shaped coils 100 are mounted.

The interval distance between the comb teeth 22 and comb teeth-shaped groove 23 at one end of the jig main body 21 and the comb teeth 22 and comb teeth-shaped groove 23 at the other end is substantially equal to the length in the extending direction of the straight portion 102 of the band-shaped coil 100. Therefore, the straight portion 102 of the band-shaped coil 100 can be accommodated over the comb-shaped groove 23 at one end and the comb-shaped groove 23 at the other end of the jig main body 21.

The coil wincing jig 2 is formed so that the outside diameter of the coil winding jig 2 defined by the position of the leading end of the comb teeth 22 is no more than the inside diameter of the stator core, so that it becomes possible to insert inside of the stator core. The coil winding jig 2 is arranged at a predetermined site of the coil forming apparatus 1, and is provided to be rotatable in the d1 direction shown by the arrow in FIG. 1, centered around the axial hole 24 by driving of a motor which is not illustrated.

Coil Conveying Mechanism Unit

Figure 2:
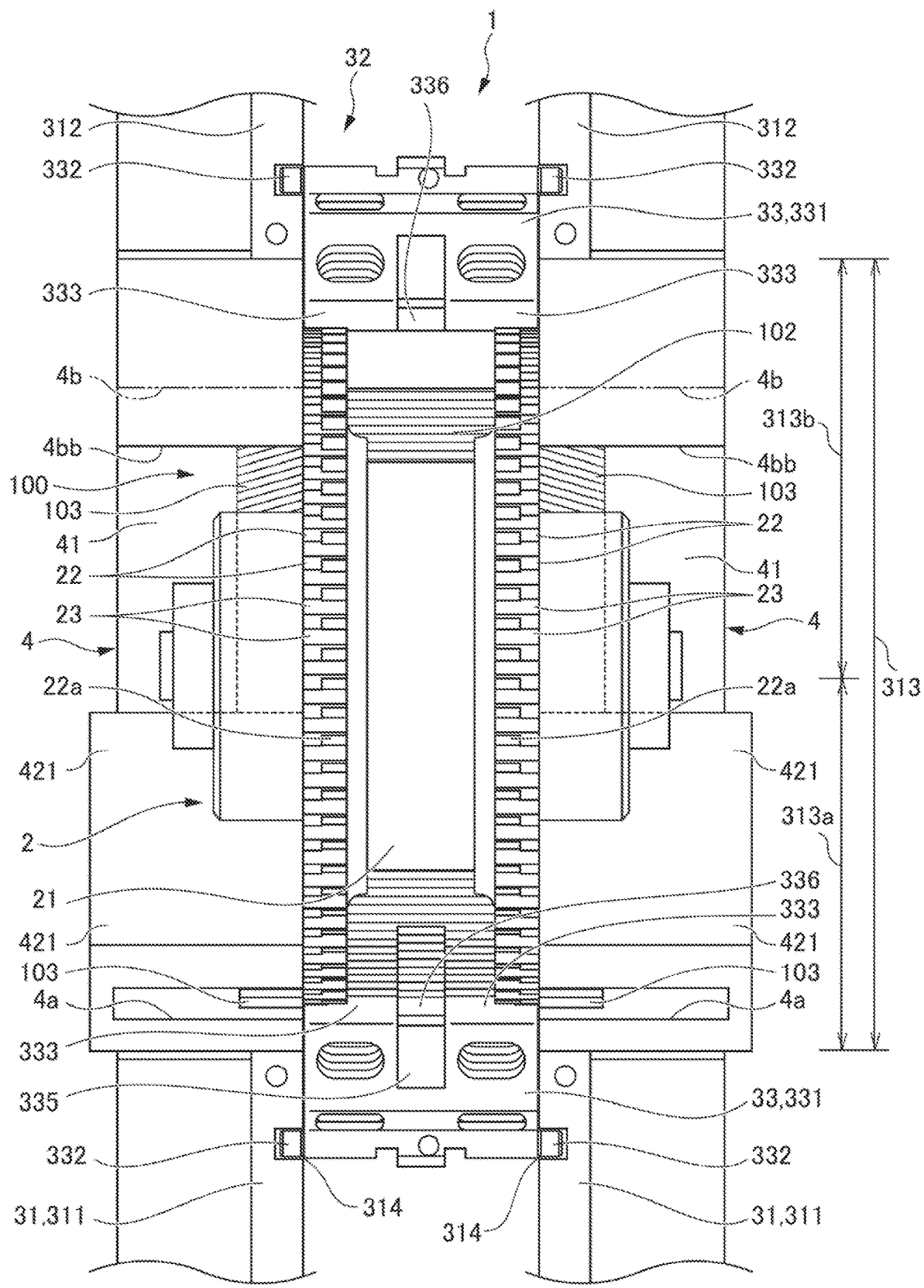
FIG. 2 is a drawing viewing the coil forming apparatus shown in FIG. 1 from the A direction in FIG. 1.

The coil conveying mechanism unit 3 pivotally conveys the band-shaped coil IOC along at least part of the outer circumference of the coil winding jig 2. More specifically, the coil conveying mechanism unit 3 has a pair of conveying rails 31 constituting a conveying path of the band-shaped coil 100, and a conveyor 32 which grips the band-shaped coil 100 and conveys along the conveying rails 31, as shown in FIGS. 1 and 2.

The conveying rails 31 are formed in a band-shaped plate made of metal, and arranged in parallel to each other with substantially equal intervals to the length of the straight portion 102 of the band-shaped coil 100, in the width direction of the coil forming apparatus 1. The interval of the pair of conveying rails 31 is substantially equal to the interval distance in the axial direction of the comb teeth 22 and comb-shaped groove 23 of the coil winding jig 2, as shewn in FIG. 2.

The conveying rails 31 includes a pair of upper and lower parallel linear conveying parts 311, 312 forming a linear conveying path, and a pivot conveying unit 313 which connects the ends of the linear conveying parts 311, 312 in an arc shape, thereby forming a lateral U-shaped conveying path. The conveying rails 31 are provided so as to surround the coil winding jig 2 by arranging on the inner side of the U-shaped portion, so that the pivot conveying unit 313 follows the outer circumference of the coil winding jig 2. As shown in FIG. 2, pairs of guide grooves 314 spanning the entire length of the conveying rail 31 are respectively provided to the faces on which the pair of conveying rails 31 are opposing each other. The guide groove 314 forms a travel path of a conveyor 32 described later.

In the present embodiment, the pivot conveying unit 313 of the coil conveying mechanism unit 3 is formed along a range approximately ½ of the outer circumference of the coil winding jig 2. The pivot conveying unit 313 includes a first half portion 313a on the introducing side of the band-shaped coil 100 and a second half portion 313b on the discharging side of the band-shaped coil 100. The first half portion 313a is formed over a range of approximately ½ the first half of the pivot conveying unit 313. The second half portion 313b is provided over a range of approximately ½ the second half of the pivot conveying unit 313. However, the pivot conveying unit 313 may be configured to be able to pivotally convey the band-shaped coil. 100 along at least a portion of the outer periphery of the coil winding jig 2.

The conveyor 32 extends long along the conveying rail 31 and can move along the conveying rail 31 between the pair of conveying rails 31. The conveyor 32 has a length corresponding to at least the total length of the band-shaped coil 100, and moves along the conveying rail 31 in a state of holding the straight portions 102 of the band-shaped coil 100 on the upper surface, thereby pivotally conveying the band-shaped coil 100 along the outer periphery of the coil winding jig 2.

Figure 5:
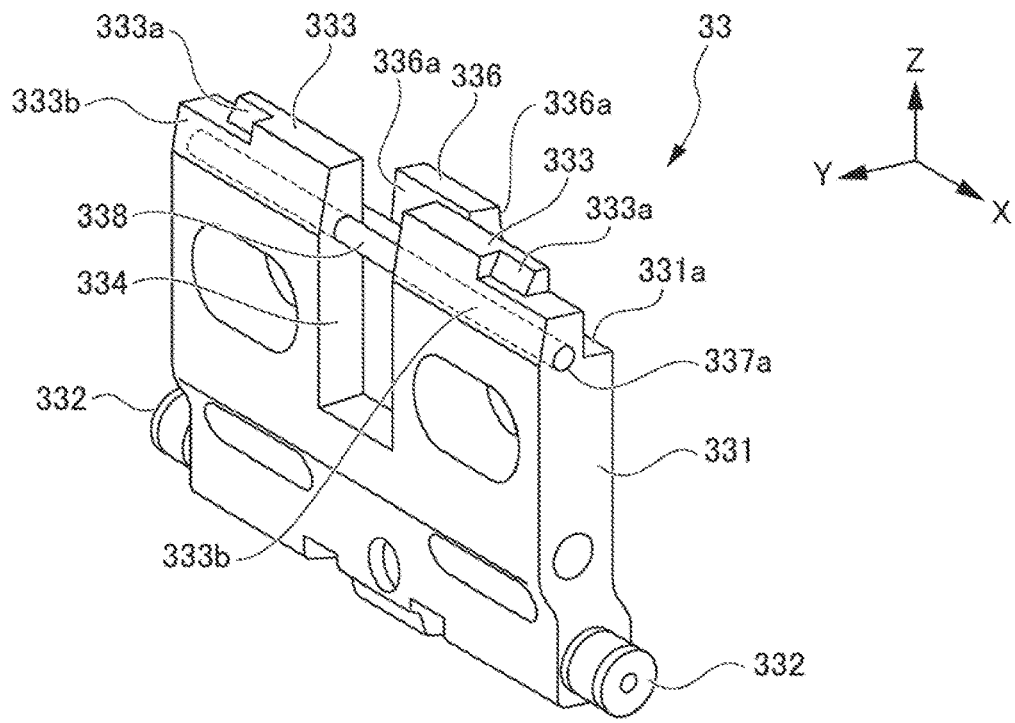
FIG. 5 is a perspective view showing a piece member of a grip portion of a coil conveying mechanism unit.
Figure 6:
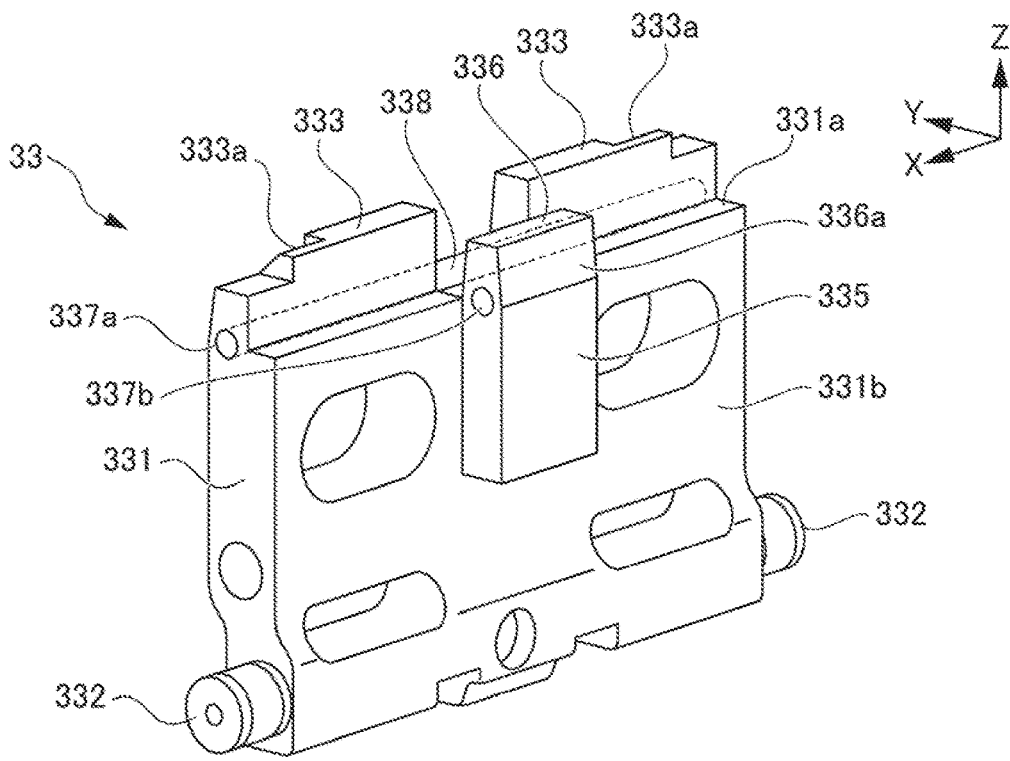
FIG. 6 is a perspective view showing an aspect viewing the piece member of the grip portion of the coil conveying mechanism unit from the opposite side of FIG. 5.
Figure 7:
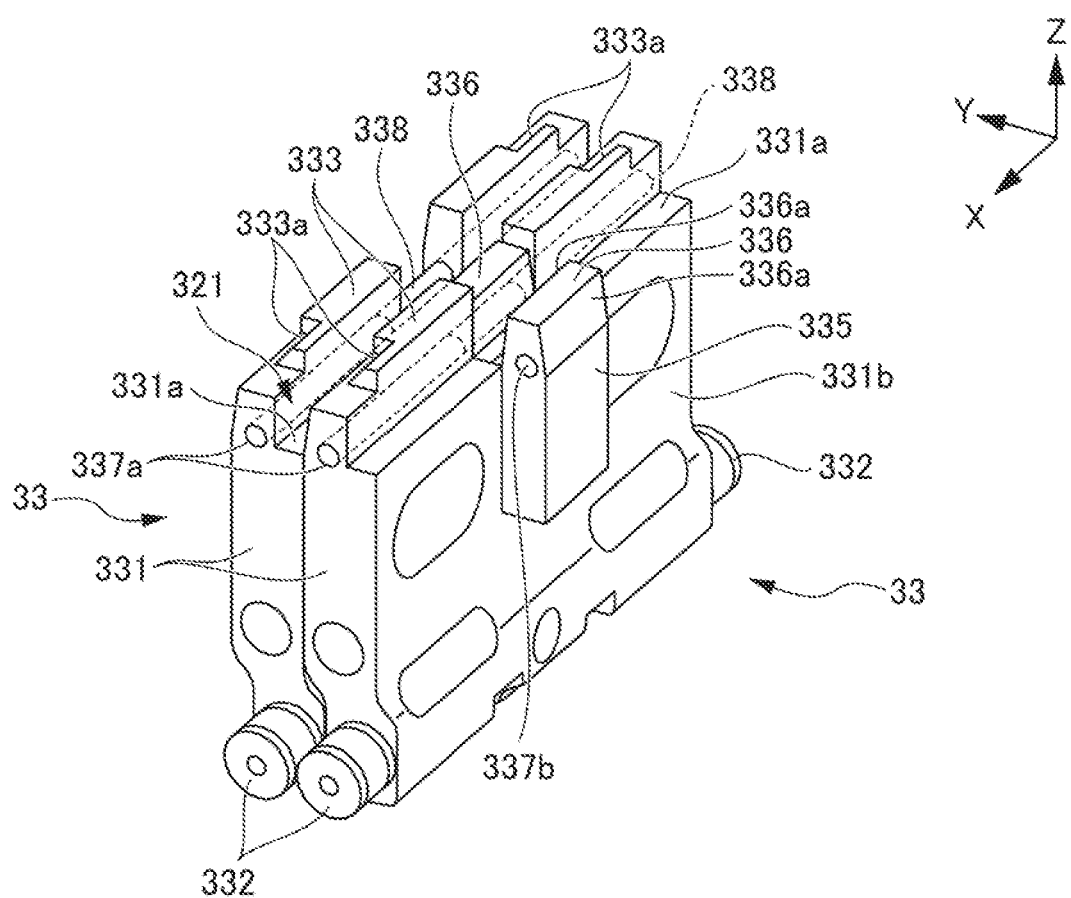
FIG. 7 is a perspective view showing a state connecting two piece members.

As shown in FIGS. 1 and 3, the conveyor 32 includes a plurality of piece members 33 of the same structure arranged in a multilayer shape along the length direction of the band-shaped coil 100. As shown in FIGS. 5, 6 and 7, the piece members 33 each include a piece member body 331 having a substantially rectangular plate-like shape made of metal, and a pair of guide projections 332, each projecting laterally from both ends in the width direction at the lower end of the piece member body 331. The guide projections 332 of the present embodiment each include a rotatable roller; however, they may be simple projections. In addition, regarding the directions of the piece member 33, in FIGS. 5, 6, and 7, the X direction is defined as the width direction, the Y direction is defined as the thickness direction, and the Z direction is defined as the height direction. In the height direction, the upper direction in the drawings is defined as "up", and the lower direction is defined as "down".

The piece member body 331 has a thickness substantially equal to the gap between adjacent straight portions 102 and 102 in the length direction of the band-shaped coil 100. The piece member body 331 has an upper end surface 331a, and the upper end surface 331a includes a pair of first gripping claws 333, each projecting in the height direction. The first gripping claw 333 has a thickness of approximately ½ the thickness of the piece member body 331. The thickness of the first gripping claw 333 is substantially equal to the gap between the adjacent straight portions 102 and 102 of the band-shaped coil 100. The first gripping claw 333 is provided at a position in the vicinity of one end in the thickness direction of the piece member body 331 on the upper end surface 331a. The pair of first gripping claws 333 are disposed apart from each other on both end sides in the width direction of the piece member body 331 with a predetermined interval therebetween.

The first gripping claws 333 each have an upper end surface, anti the upper end surface includes a meshing groove 333a that meshes with a tip of the comb tooth 22 of the coil winding jig 2. More specifically, as shown in FIG. 4, the tip of the comb tooth 22 of the coil winding jig 2 has an engaging portion 22a. The meshing groove 333a has a position and a shape capable of meshing with the engaging portion 22a of the coil winding jig 2.

The first gripping claws 333 each have a tapered surface 333b on the side opposite to the side on which the upper end surface 331a is provided. The tapered surface 333b allows the first gripping claw 333 to be formed in a slightly tapered shape as it moves away from the piece member body 331.

The pair of first gripping claws 333 has a rectangular recess 334 along the height direction of the piece member body 331 provided therebetween. The recess 334 is provided to span from the upper end surface 331a to the portion approximately ½ the height of the piece member body 331. The depth of the recess 334 along the thickness direction of the piece member body 331 has a depth of approximately ½ the thickness of the piece member body 331, similarly to the first gripping claw 333.

The piece member body 331 includes a rectangular protrusion 335 provided on one side surface 331b. The protrusion 335 is provided to protrude, in the thickness direction of the piece member body 331, in a block shape toward a direction perpendicular to the side surface 331b from the side surface 331b which is opposite to the side where the first gripping claw 333 is provided. The protrusion 335 is provided above a site which is approximately ½ the height of the piece member body 331 in the height direction. The height of the protrusion 335 along the height direction of the piece member body 331 is substantially equal to the height of the recess 334. The thickness of the protrusion 335 along the thickness direction of the piece member body 331 is substantially equal to the depth of the recess 334.

The protrusion 335 includes a second gripping claw 336 provided at an upper end portion thereof. Similarly to the first gripping claws 333, the second gripping claw 336 projects upward from the upper end surface 331a of the piece member body 331. Similarly to the first gripping claws 333, the thickness of the second gripping claw 336 is substantially equal to the gap between the adjacent straight portions 102 and 102 of the band-shaped coil 100. Since the second gripping claw 336 has the same width as the protrusion 335, as shown in FIG. 7, when the two piece members 33 and 33 are stacked with their directions aligned with each other, the second gripping claw 336 of the one piece member 33 is disposed between the pair of first gripping claws 333 and 333 of the other piece member 33.

The second gripping claw 336 has tapered surfaces 336a on both the side on which the upper end surface 331a is provided and the opposite side thereto. These tapered surfaces 336a allow the second gripping claw 336 to be formed in a slightly tapered shape as it moves away from the piece member body 331.

As shown in FIG. 7, the plurality of piece members 33 are aligned such that the first gripping claws 333 and the second gripping claws 336 are oriented in the same direction, and the protrusions 335 of the piece member 33 are stacked so as to be accommodated in the recess 334 of the adjacent piece member 33. As a result, the adjacent piece members 33 and 33 are in close contact with each other and stacked.

The piece member 33 includes a through hole 337a extending in the width direction of the piece member 33 at a portion in the vicinity of the root of the first gripping claw 333 and substantially at the same height as the upper end surface 331a of the piece member body 331. In addition, the protrusion 335 includes a through hole 337b extending in the width direction of the protrusion 335 at a portion in the vicinity of the root of the second gripping claw 336 and substantially at the sane height as the upper end surface 331a of the piece member body 331. As shown in FIG. 7, after the two piece members 33 and 33 are stacked, a shaft member 338 is inserted to span the through hole 337a and the through hole 337b which are in communication with each other. Thus, with the shaft member 338 as a rotation axis, the lower end sides of the plurality of pieces members 33 where the guide projections 332 are provided are coupled with each other in a rotatable (swingable) manner in the length direction of the conveyor 32, thereby forming an elongated conveyor 32.

Figure 8:
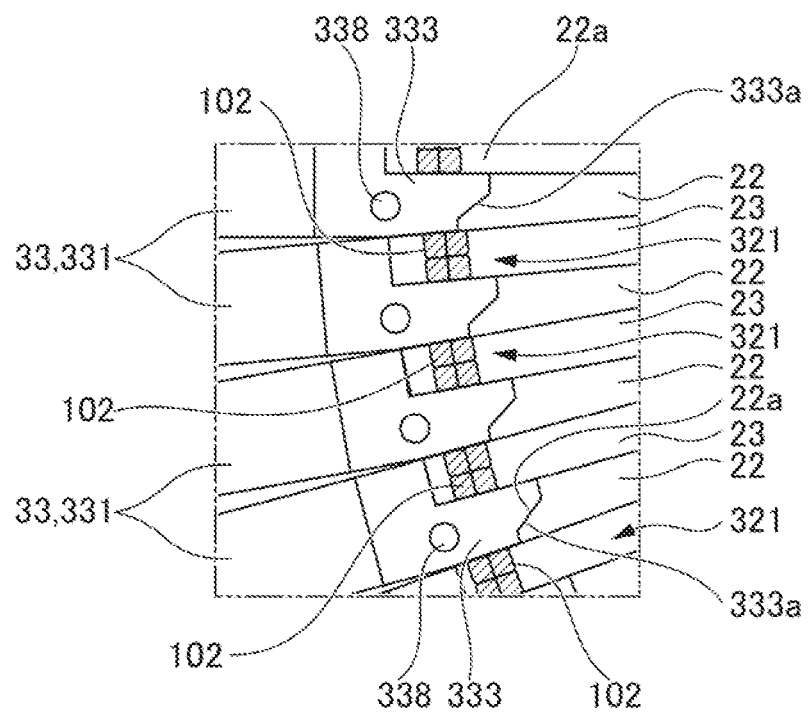
FIG. 8 is an enlarged view of a portion E in FIG. 1.

As shown in FIGS. 3, 7, 8, and 9, in the conveyor 32, gripping grooves 321 each gripping the straight portion 102 of the band-shaped coil 100 is provided between the first gripping claws 333 and 333, and between the second gripping claws 336 and 336 of the adjacent piece members 33, 33. The upper end surface 331a of the piece member body 331 is provided at the bottom of the gripping groove 321. The gripping grooves 321 each have a groove width capable of accommodating the straight portion 102 of the band-shaped coil 100. The groove width of the gripping groove 321 is substantially equal to the groove width along the circumferential direction of the comb-shaped groove 23 of the coil winding jig 2. The arrangement pitch of the gripping grooves 321 along the length direction of the conveyor 32 is substantially equal to the arrangement pitch of the comb-shaped groove 23 along the circumferential direction of the coil winding jig 2. Therefore, when the meshing groove 333a and the engaging portion 22a are engaged with each other, as shown in FIG. 8, the gripping groove 321 of the conveyor 32 and the comb-shaped groove 23 of the coil winding jig 2 are in communication with each other in the radial direction of the coil winding jig 2.

In the conveyor 32, each guide projection 332 of the piece member 33 is slidably accommodated in the guide groove 314 of the conveying rail 31, and protrudes toward the inside of the U-shaped conveying rail 31. Furthermore, as shown in FIG. 8, the meshing groove 333a of the piece member 33 meshes with the engaging portion 22a of the coil winding jig 2 at the location immediately below the coil winding jig 2, such that the conveyor 32 is in synchronization with the rotation of the coil winding jig 2 by the rotation of the coil winding jig 2 in the direction d1 so as to be movable in the direction d2. When the conveyor 32 moves in an arc shape along the pivot conveying unit 313 of the conveying rail 31, the guide projections 332 of the piece members 33 and 33 adjacent to each other rotate by means of the shaft member 338 so as to be isolated with the portions of the first gripping claw 333 and the second gripping claw 336 which are sites for gripping the straight portions 102 as references, such that the conveyor 32 is smoothly movable.

Figure 9:
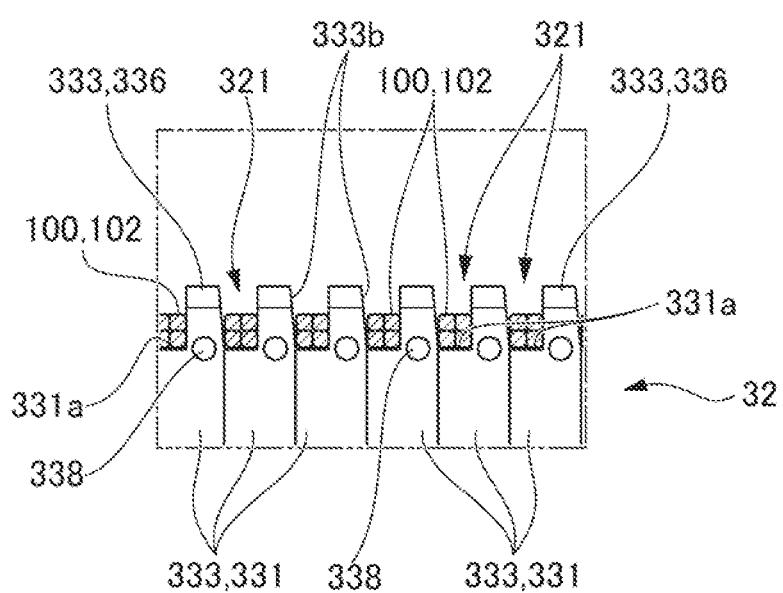
FIG. 9 is an enlarged view of a portion C in FIG. 1.

As shown in FIGS. 3, 8, and 9, in the conveyor 32 which is slidably disposed on the conveying rail 31, the first gripping claw 333 and the second gripping claw 336 are inserted into the gap between the straight portions 102 and 102 adjacent to each other, in the length direction of the band-shaped coil 100, and the straight portions 102 are accommodated in the respective gripping grooves 321, whereby the band-shaped cell 100 is gripped. Therefore, it is possible for the conveyor 32 to convey the band-shaped coil 100 in a state of holding the straight portions 102 at regular intervals without displacing the straight portions. As shown in FIGS. 2 and 3, the side ends 103 of the band-shaped coil 100 protrude laterally on both sides in the moving direction of the conveyor 32. It should be noted that, in FIG. 1, the band-shaped coil 100 to be gripped by the conveyor 32 is not shown.

Guide Member

As shown in FIG. 3, the guide members A are made from a metal band-shaped plate material, and provided in a substantially U-shape laterally along the pivot conveying unit 313 of the conveying rail 21. In the guide members 4, the inside of the U-shaped portion is provided so as to face the direction of the coil winding jig 2 in the vicinity of the both ends of the coil winding jig 2 in the axial direction (the vertical direction relative to the paper plane of FIG. 1, and the left-right direction in FIG. 2) so as to sandwich the coil winding jig 2, and is fixed to the conveying rail 31.

The guide member A guides the side end 103 of the band-shaped coil 100 conveyed by the conveyor 32 along its own inner wall surface 41 from the introduction end 4a over to the discharge end 4bb. The inner wall surface 41 of the guide member 4 is formed, by a curved surface which smoothly curves continuously so as to follow approximately ½ the range of the outer circumference of the coil winding jig 2, from the introduction end 4a to the discharge end 4bb. Approximately ½ the range of the outer circumference of the coil winding jig 2 corresponds to the range shown as the second half portion 313b of the pivot conveying unit 313 in FIG. 10. The guide member 4 smoothly guides in an arc shape so that the entirety of the band-shaped coil 100 follows the outer circumference of the coil winding jig 2, by bringing the side end 103 introduced from the introduction end 4a into contact with the inner wall surface 41, while being pivotally conveyed by the pivot conveying unit 313.

Figure 10:
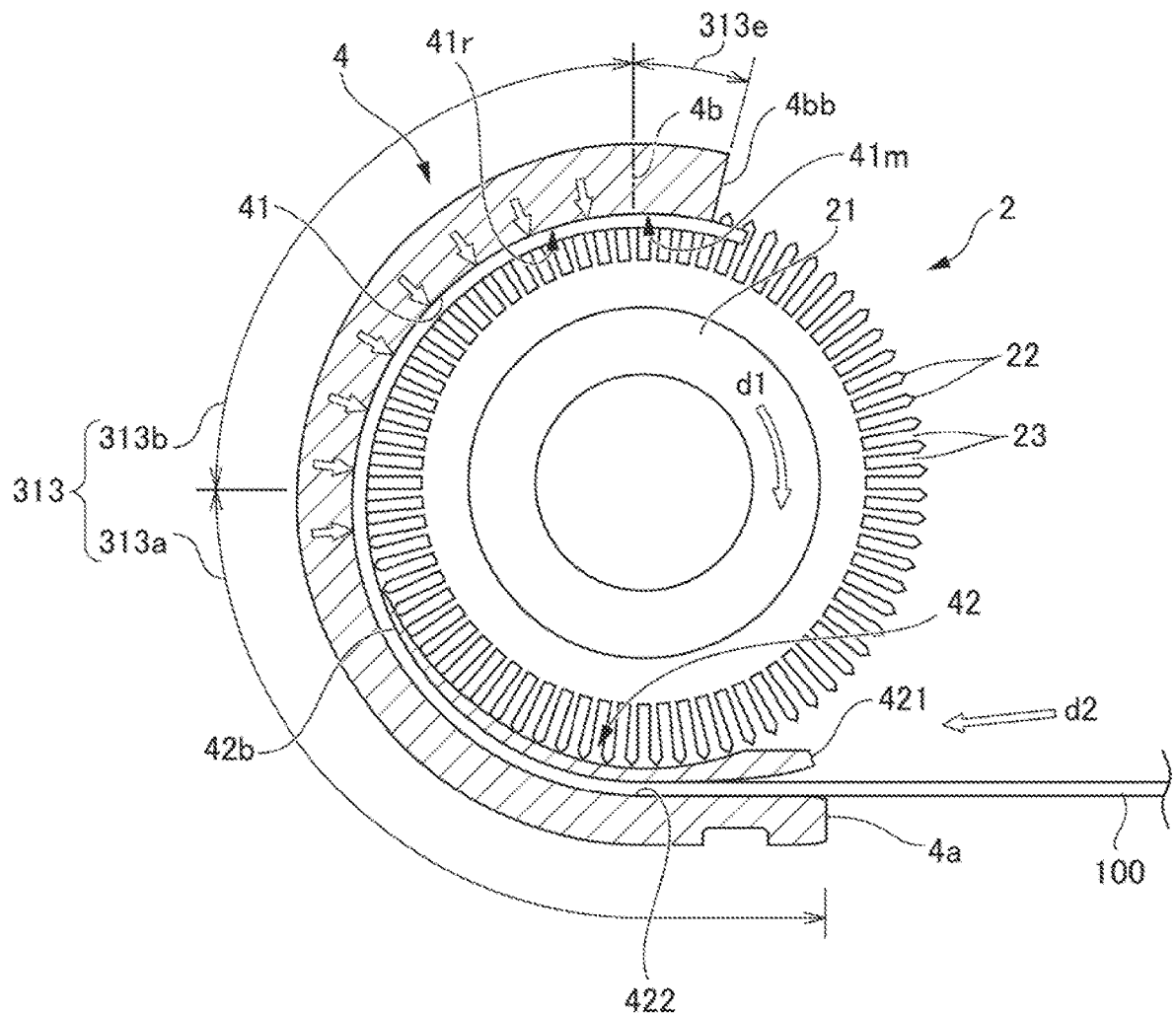
FIG. 10 is a cross-sectional view showing an aspect of the band-shaped coil being guided into an arc shape in the coil winding jig by a guide member.
Figure 11:
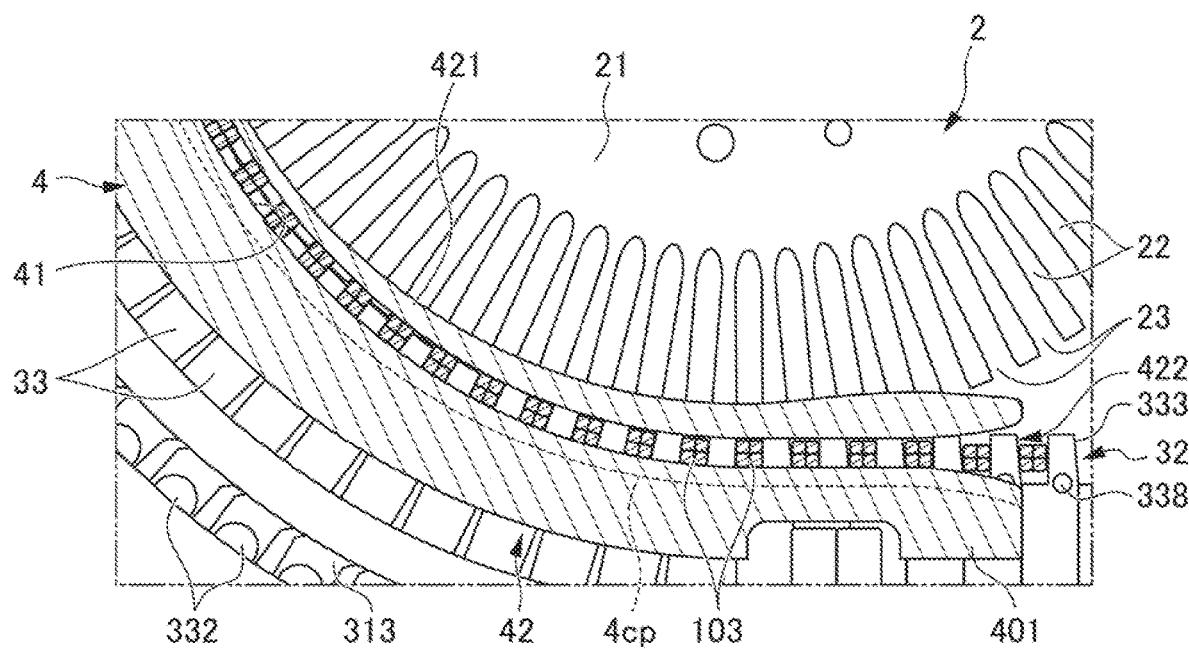
FIG. 11 is an enlarged cross-sectional view of a portion D in FIG. 1.

As easily understood by referencing FIG. 10, the path curved from the introduction end 4a to the discharge end 4bb of the guide member 4 includes a diameter-reducing guide part 41r corresponding to the second half portion 313b of the pivot conveying unit 323, and an extension guide part 41m connecting to this. The diameter-reducing guide part 41r is a guide part formed in the second half portion of pivot conveying of the band-shaped coil 100, i.e. portion corresponding to the second half portion 313b of the pivot conveying unit 313, so that the radius of curvature increases along the path of this pivot conveying and gradually reduces in diameter. The starting edge of the second half portion 313b of the pivot conveying unit 313 substantially corresponds to the starting edge of the diameter-reducing guide part 41r, and the end edge of the second half portion 313b of the pivot conveying unit 313 corresponds to the end edge 4b of the diameter-reducing guide part 41r. The extension guide part 41m is a guide part linking to the end edge 4b of the diameter-reducing guide part 41b and extending a predetermined length maintaining the diameter by the curvature of this end edge 4b. FIG. 10 notes this extending length as an extension portion 313e linking to the end edge of the second half portion 313b of the pivot conveying unit 313. This extension length is set; to a length which can abut, at least a pair of the straight portions 102 connected to the same side end 103 of the band-shaped coil 100.

As shown in FIG. 10, the inner wall surface 41 of the introduction end 4a of the guide member 4 is arranged somewhat more to the outer side in the radial direction than the outer circumference of the coil winding jig 2. However, the inner wall surface 41 gradually reduces in diameter smoothly as approaching the end edge 4b of the diameter-reducing guide part 41r from the introduction end 4a. The inner wall surface 41 at the end edge 4b of the diameter-reducing guide part 41r is arranged more to the inner side in the radial direction than the outer circumference of the coil winding jig 2. For this reason, the inner wall surface 41 of the diameter-reducing guide part 41r of the guide member 4 guides the band-shaped coil 100 so as to gradually round into an arc of a smaller diameter than the outside diameter of the coil winding jig 2, while contacting the side end 103 of the band-shaped coil 100, as the band-shaped coil 100 enters the second half portion 313b from the first half portion 313a of the pivot conveying unit 313.

The band-shaped coil 100 is gradually pressed toward the coil winding jig 2, by being guided to the inner wall surface 41 of the diameter-reducing guide part 41r of the guide member 4, as approaching the second half portion 313b from the first half portion 313a of the pivot conveying unit 313. The straight portion 102 gripped by the conveyor 32 thereby forcibly separates from the gripping groove 321 so as to lift up, and gradually moves towards the inside of the comb teeth-shaped groove 23 of the coil winding jig 2. The inner wall surface 41 of the diameter-reducing guide part 41r of the guide member 4 is arranged more to the inner side in the radial direction than the outer circumference of the coil winding jig 2; therefore, the straight portion 102 is completely inserted into the comb teeth-shaped groove 23 of the coil winding jig 2.

Immediately following the end edge 4b of the diameter-reducing guide part 41r, the band-shaped coil 100 is further regulated until reaching the discharge end 4bb, so that, the shape reduced in diameter in the course of reaching the end edge 4b does not spring back by the extension guide part 41m. For this reason, the band-shaped coil 100 maintains a fixed diameter (curvature) reduced in diameter in the course of reaching the end edge 4b, detaches from the guide member 4 at the discharge end 4bb, and is wound on the coil winding jig 2 by rotation of the coil winding jig 2. It should be noted that, in FIGS. 10 and 12, the conveyor 32 is omitted from illustration, and the band-shaped coil 100 is shown to be simplified. In this case, the path length of the extension guide part 41m is set to a length capable of abutting at least a pair of the straight portions 102 linking to the same side end 103 of the band-shaped coil 100; therefore, spring back is effectively inhibited.

It should be noted the guide member 4 is not limited to a structure having the inner wall surface 41 which is continuous over the entirety of the pivot conveying unit 313 as in the present embodiment. The guide member 4, although not illustrated, may be a structure arranging a plurality of guide rollers so as to follow the pivot conveying unit 313, for example. However, in the viewpoint of configuring so as to be able to continuously guide the band-shaped coil 100 to the comb teeth-shaped groove 23 of the coil winding jig 2, and be able to smoothly insert the straight portion 102 into the comb teeth-shaped groove 23, the guide member 4 preferably has the inner wall surface 41 contacting at the wall surface with the side end 103 at the second half portion 313b of the pivot conveying unit 313. In the viewpoint of configuring so as to be able to smoothly guide the band-shaped coil 100 into an arc shape over the entirety of the pivot conveying unit 313, and be able to smoothly insert the straight portion 102 into the comb teeth-shaped groove 23 of the coil winding jig 2, the guide member 4 preferably has the inner wall surface 41 contacting at the wall surface with the side end 103 in the entirety of the pivot conveying unit 313 as in the present embodiment.

As shown in FIGS. 1 and 2, the guide member 4 has, at the side of: the introduction end 4a thereof, the pair of reforming portions 42 for causing the band-shaped coil 100 introduced to the pivot conveying unit 313 to forcibly deform and reform so as to curve into an arc shape along the outer circumference of the coil winding jig 2. In the guide member 4, the range in which the reforming portion 42 is provided is within the range of the first half portion 313a of the pivot conveying unit 313. More specifically, the reforming portion 42, for example, can be provided from the introduction end 4a of the guide member 4 over a range of approximately ½ to approximately ¾ of the first half portion 313a of the pivot conveying unit 313.

The reforming portion 42 is configured by the inner wall surface 41 of the guide member 4 and guide plates 421. The guide plates 421 are formed so as to smoothly curve in an arc shape along the curvature of the inner wall surface 41 of the guide member 4. The guide plates 421, similarly to the guide member 4, are respectively arranged so as to sandwich the coil winding jig 2 from both end sides in the axial direction, and are fixed to the guide member 4. In the reforming portion 42, a reforming groove 422 pinching the side end 103 is formed between the inner wall surface 41 and guide plate 421. The inner wall surface 41 of the reforming portion 42 contacts and supports the surface on the outer side in the radial direction of the side end 103 of the band-shaped coil 100, and the guide plates 423 contact and support the surface on the inner side in the radial direction of the side end 103 of the band-shaped coil 100.

The reforming portion 42 causes the side end 103 of the band-shaped coil 100 introduced to the introduction end 4a of the guide member 4 to forcibly deform so as to curve into an arc shape, by conveying while being accepted and clamped in the reforming groove 422. The band-shaped coil 100 is reformed into an arc shape, at an early stage of introduction of the pivot conveying unit 313 before winding on the coil winding jig 2, and the force trying to elastically recover to a flat shape while guided to an arc shape by the inner wall surface 41 of the guide member 4 subsequently is suppressed. Therefore, the band-shaped coil 100 is smoothly and precisely molded into the substantially cylindrical wound shape, in combination with being guided into the arc shape by the guide member 4.

Coil Forming Method

Next, a method of forming the band-shaped coil 100 into a substantially cylindrical wound state by the coil forming apparatus 1 will be described.

First, the coil winding jig 2 is provided to be rotatable by the driving of a motor (not shown) inside the U-shaped portion of the conveying rail 31 of the coil forming apparatus 1. After the coil winding jig 2 is provided in the coil forming apparatus 1, the band-shaped coil 100 which is formed in advance in a long corrugated band shape is supplied to the conveyor 32 which is provided in the straight conveying unit 311 on the lower side of the conveying rail 31 by a coil feeding device or an operator (not shown). The band-shaped coil 100 is gripped by the conveyor 32 by inserting the first gripping claws 333 and the second gripping claws 336 of the respective piece members 33 of the conveyor 32 into the gaps between the adjacent straight portions 102 and 102, and by accommodating the straight portions 102 in the gripping grooves 321, respectively.

Thereafter, the conveyor 32 gripping the base-shaped coil 100 is pressed by a conveyer pressing device (not shown) or an operator, and the straight conveying unit 311 is moved toward the coil winding jig 2 so that the meshing groove 333a of the piece member 33 and the engaging portion 22a of the coil winding jig 2 are engaged with each other. When the coil winding jig 2 is rotationally driven in the direction d1 after the meshing groove 333a and the engaging portion 22a are meshed with each other immediately below the coil winding jig 2, the conveyor 32 moves the conveying rail 31 along the direction d2 in synchronization with the rotation of the ceil winding jig 2, and pivotally conveys the band-shaped coil 100 along the outer periphery of the coil winding jig 2 (coil conveying step).

When the conveyor 32 reaches the pivot conveying unit 313, the side end 103 of the band-shaped coil 100 is first introduced into the reforming groove 422 of the reforming portion 42 from the introduction end 4a of the guide member 4, and is pivotally conveyed while being sandwiched between the inner wall surface 41 and the guide plate 421. Thus, the band-shaped coil IOC is forcibly deformed and reformed so as to be curved in an arc shape along the reforming groove 422 (reforming step).

The band-shaped coil 100 passing through the reforming portion 42 is guided so as to be gradually rounded in an arc shape while being pivotally conveyed along at least a portion of the cuter periphery of the coil winding jig 2 along the inner wall surface 41 of the guide member 4, i.e., a range of approximately ½ the outer periphery of the coil winding jig 2, accompanying the rotation of the coil winding jig 2.

Since the curvature of the inner wall surface 41 of the guide member 4 gradually increases from the first half portion 313a to the second half portion 313b of the pivot conveying unit 313, the side end 103 of the band-shaped coil 100 is pressed by the inner wall surface 41 so as to gradually decrease the diameter inwardly in the radial direction. Thus, the banc-shaped coil 100 is rounded to have a smaller diameter than the outer diameter of the coil winding jig 2. The side end 103 which is pressed against the inner wall surface 41 gradually separates the straight portions 102 from the gripping grooves 321 toward the comb-shaped groove 23 of the coil winding jig 2 as the band-shaped coil 100 approaches the discharge end 4bb of the guide member 4. As shown in FIG. 10, the straight, portions 102 completely detached from the gripping grooves 321 are inserted into the respective comb-shaped grooves 23 of the coil winding jig 2 in communication with the grapping grooves 321, while being pressed against the inner wall surface 41 of the guide member 4 (guiding step).

The guiding step includes a diameter-reducing guide step and an extension guide step. In the diameter-reducing guide step, the band-shaped coil 100 is guided so as to gradually reduce in diameter accompanying pivoting, until the end edge 4b of the diameter-reducing guide part 41r, in the second half portion of this pivot conveying. In the extension guide step, the band-shaped coil 100 is regulated so as to maintain the diameter by a fixed curvature until reaching the discharge end 4bb in the extension guide part 41m, so that the shape reduced in diameter in the course of reaching the end edge 4b does net spring back. The path length of the extension guide part 41m is set to a length capable of abutting at least a pair of the straight portions 102 linking to the same side end 103 of the band-shaped coil 100; therefore, spring back is effectively inhibited. Subsequently, the band-shaped coil 100 is discharged from the discharge end 4*bb* of the guide member 4, while being wound in the coil winding jig 2, accompanying rotation of the coil winding jig 2.

Figure 12:
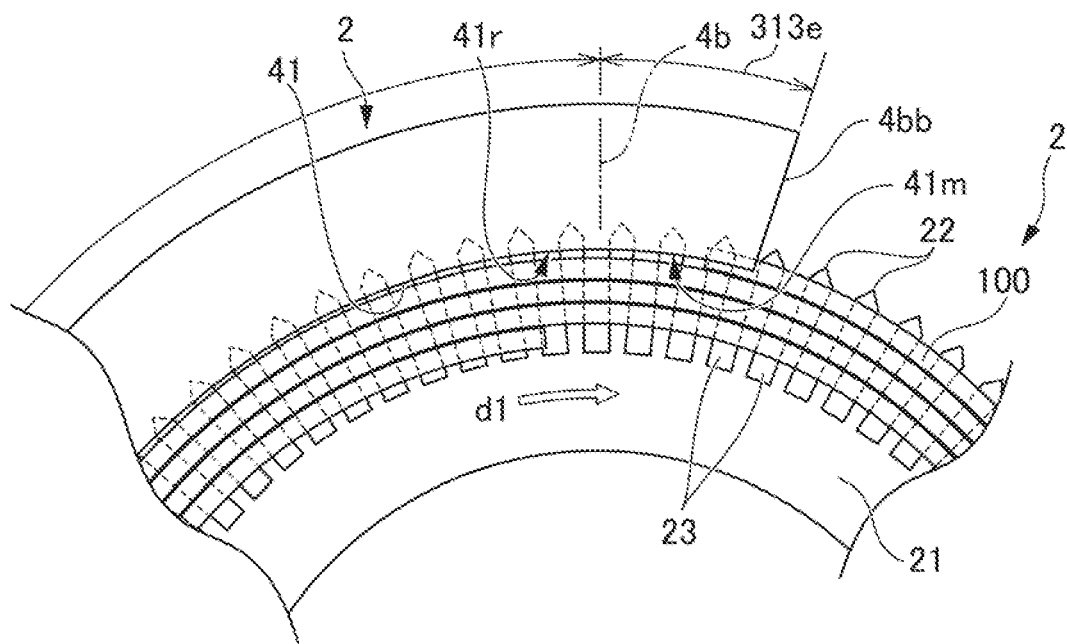
FIG. 12 is a partial enlarged view showing an aspect of the band-shaped coil being wound multiply on the coil winding jig.
Figure 13:
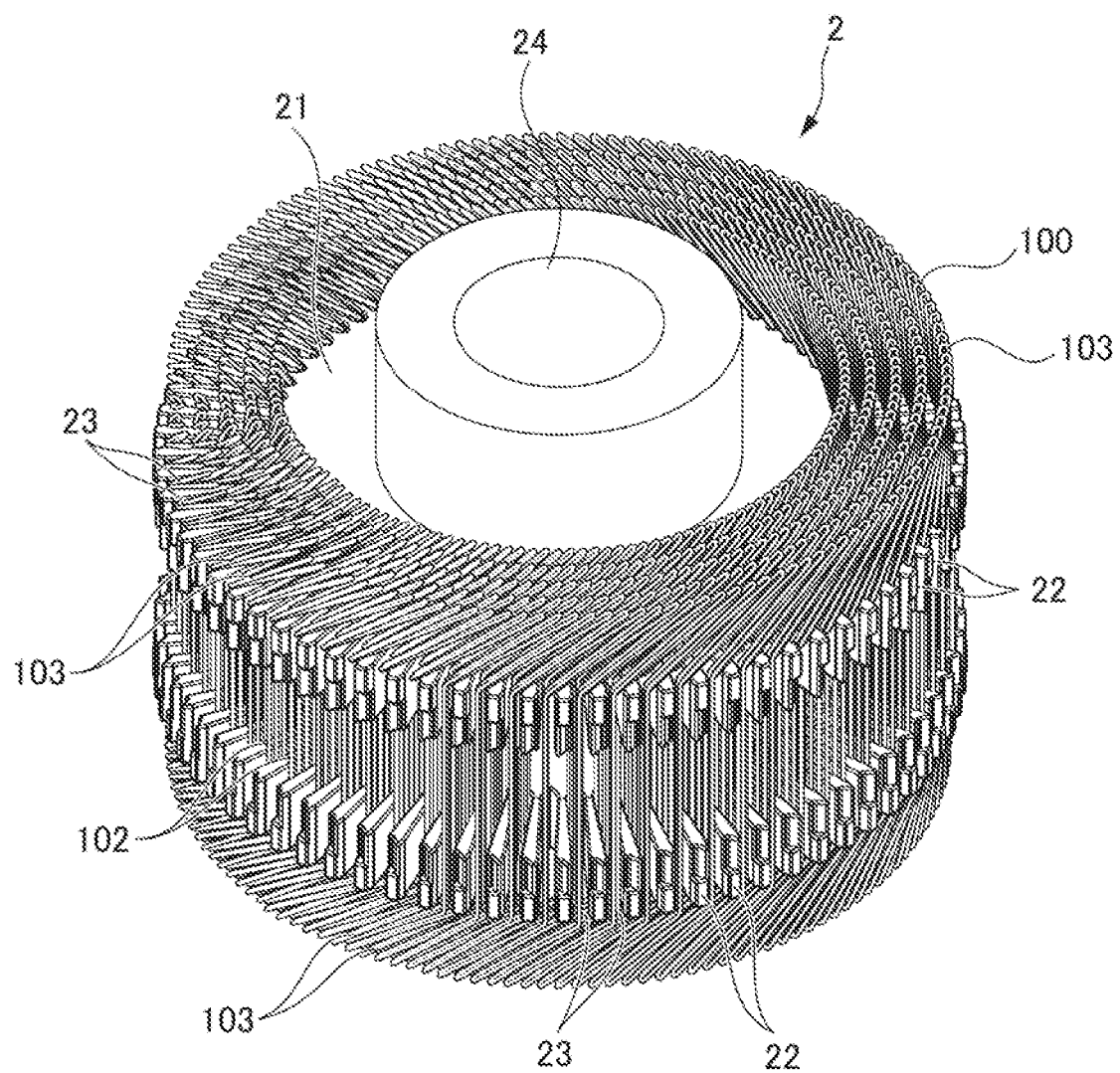
FIG. 13 is a perspective view showing a state in which the band-shaped coil is molded in a wound state on the coil winding jig.

If the entirety of the conveyor 32 finishes moving along the conveying rails 31, the band-shaped coil 100 is wound four, times around the coil winding jig 2 to be multiply wound, as shown in FIG. 12, by the straight portions 102 being introduced into the comb teeth-shaped grooves 23 in a layered manner. The band-shaped coil 100 is thereby easily molded into a substantially cylindrical wound state, as shown in FIG. 13. Since the straight portions 102 of the band-shaped coil 100 in the wound state is accommodated within the comb teeth-shaped grooves 23, there is no concern of displacing. Therefore, the band-shaped coil 100 can stably hold the substantially cylindrical wound state. It should be noted that the band-shaped coil is not limited to being multiply wound on the coil winding jig 2.

According to the above explained coil forming apparatus 1, the following effects are exerted. That is, the coil forming apparatus 1 forms the band-shaped coil 100 in a wound state, and the banc-shaped coil 100 includes the plurality of straight portions 102 and the side ends 103 provided on both ends of the plurality of straight portions 102. The coil forming apparatus 1 includes: the coil winding jig 2 that winds the band-shaped coil 100, the coil winding jig 2 including the plurality of comb-shaped grooves 23 on the outer periphery thereof, each of which can hold a respective one of the plurality of straight portions 102 therein; the coil conveying mechanism unit 3 that pivotally conveys the band-shaped coil 100 along at least a portion of the outer periphery of the coil winding jig 2; and the guide members 4 that are respectively provided in the vicinity of both ends of the coil winding jig 2 in the axial direction, and respectively guide the band-shaped coil 100 into an arc shape to insert into the plurality of comb-shaped grooves 23 while being in contact with the side ends 103. The guide member 4 includes the diameter-reducing guide part 41*r* formed so as to gradually reduce in diameter accompanying pivoting at the second half portion of pivot conveying of the band-shaped coil 100, and the extension guide part 41*m* linking to the end edge 4*b* of the diameter-reducing guide part 41 and extending a predetermined length maintaining the diameter by the curvature of the end edge 4*b*. Accordingly, the band-shaped coil 100 is gradually reduced in diameter by the diameter-reducing guide part 41*r* at the second half portion of pivot conveying, and spring back is suppressed by the extension guide part 41*m* linking to the end edge 4*b*, even when reaching the end edge 4*b* of the diameter-reducing guide part 41*r*. For this reason, the winding posture being distorted in the coil winding jig by spring back of the band-shaped coil is avoided. Therefore, it is possible to continuously insert the straight portion 102 of the band-shaped ceil 100 into the comb-shaped grooves 23 of the coil winding jig 2 and orderly wind in the coil winding jig 2. It is thereby possible to mold the band-shaped coil 100 easily into the wound state without the straight portions 102 displacing.

In the guide member 4 of the present embodiment, the extension guide part. 41*m* has an extension length capable of abutting at least the pair of straight portions 102 linking to the same side end of the band-shaped coil 100. Accordingly, spring back of the band-shaped coil 100 is effectively inhibited.

The coil forming method described above has the following advantageous effects. More specifically, the coil forming method according to the present embodiment forms the band-shaped coil 100 in a wound state, and the band-shaped coil 100 includes the plurality of straight portions 102 and the side ends 103 provided on both ends of the plurality of straight portions 102, The coil forming method includes the coil conveying step of pivotally conveying the band-shaped coil 100 along at least a portion of the outer periphery of the coil winding jig 2, the coil winding jig 2 including the plurality of comb-shaped grooves 23 on the outer periphery thereof, into which a respective one of the plurality of straight portions 102 can be inserted in the outer periphery, and being configured to wind the band-shaped coil 100; and the guiding step of guiding the band-shaped coil in an arc shape to respectively insert into the plurality of comb-shaped grooves, while providing each of the guide members 4 in the vicinity of both ends of the coil winding jig 2 in the axial direction, and contacting the guide member A with the side end 103, in which the guiding step includes: the diameter-reducing guide step of guiding the band-shaped coil 100 so as to gradually reduce in diameter along the path of the pivot conveying at the second half portion of pivot conveying; and the extension guide step of guiding, immediately after diameter-reducing guide step, by extending the band-shaped coil by a predetermined length to maintain the diameter according to the curvature immediately following. Accordingly, immediately after the diameter-reducing guide step of guiding the band-shaped coil 100 so as to gradually reduce in diameter, it advances to the extension guide step immediately following of guiding by maintaining the diameter from the curvature to extend the band-shaped coil by a predetermined length. Therefore, the band-shaped coil 100 is suppressed from spring back. For this reason, in the band-shaped coil 100, the winding posture being disturbed by spring back is avoided.

The extension guide step in the guiding step of the present embodiment maintains guidance over the extension length capable of abutting at least the pair of straight portions 102 linking to the same side end 103 of the band-shaped coil 100. Accordingly, spring back of the band-shaped coil 100 is effectively inhibited.

EXPLANATION OF REFERENCE NUMERALS 1 coil forming apparatus
2 coil winding jag
23 comb teeth-shaped groove
3 coil conveying mechanism unit
313 pivot conveying unit
313*b* second half portion
313*e* extension region
4 guide member
4*b* end edge
4*bb* discharge end
41 inner wall surface
4*m* extension guide part
41*r* diameter-reducing guide part
100 band-shaped coil
102 straight portion
103 side end

What is claimed is:
1. A coil forming apparatus that forms a band-shaped coil in a wound state, the band-shaped coil including a plurality of straight portions and side ends provided on both ends of the plurality of straight portions, the coil forming apparatus comprising:
a coil winding jig that winds the band-shaped coil, the coil winding jig including a plurality of comb-shaped grooves on an outer periphery thereof, each of which can hold a respective one of the plurality of straight portions therein;

a coil conveying mechanism that pivotally conveys the band-shaped coil along at least a portion of the outer periphery of the coil winding jig; and guide members that are provided in a vicinity of both ends of the coil winding jig in an axial direction, and guide the band-shaped coil in an arc shape to insert in a respective one of the plurality of comb-shaped grooves while being in contact with the side end, wherein the coil conveying mechanism include a first half portion of pivot conveying that is where the band-shaped coil is introduced, and a second half portion of pivot conveying that is where the band-shaped coil is discharged, wherein the guide members include a diameter-reducing guide part provided to gradually reduce in diameter in the second half portion of pivot conveying of the band-shaped coil along a path of the pivot conveying and thereby gradually presses the band-shaped coil toward the coil winding jig, and an extension guide part which links to an end edge of the diameter-reducing guide part and extends a predetermined length by maintaining the diameter according to curvature of the end edge, and thereby maintains an outer diameter of the band-shaped coil that has been reduced by the diameter-reducing guide part.

2. The coil forming apparatus according to claim 1, wherein the extension guide part has an extension length capable of abutting at least a pair of the straight portions linking to each of the side ends of the band-shaped coil.

3. A coil forming method for forming a band-shaped coil in a wound state, the band-shaped coil including a plurality of straight portions and side ends provided on both ends of the plurality of straight portions, the method comprising:

a coil conveying step of pivotally conveying the band-shaped coil along at least a portion of an outer periphery of a coil winding jig, the coil winding jig including a plurality of comb-shaped grooves on the outer periphery, each of which can hold a respective one of the plurality of straight portions therein, and being configured to wind the band-shaped coil, and a guiding step of providing guide members in a vicinity of both ends of the coil winding jig in an axial direction, guiding the band-shaped coil so as to be in an arc shape while bringing the guide member into contact with the side end so as to insert into a respective one of the plurality of comb-shaped grooves, wherein the coil conveying step include a first half step of pivot conveying that is a step in which the band-shaped coil is introduced, and a second half step of pivot conveying that is a step in which the band-shaped coil is discharged, and wherein the guiding step includes:

a diameter-reducing guide step of guiding the band-shaped coil so as to gradually reduce in diameter in the second half step of the pivot conveying along a path of the pivot conveying, thereby gradually pressing the band-shaped coil toward the coil winding jig, and an extension guide step, immediately following the diameter-reducing guide step, of guiding the band-shaped coil to extend a predetermined length by maintaining the diameter according to a curvature immediately following the diameter-reducing guide step, thereby maintaining an outer diameter of the band-shaped coil that has been reduced in the diameter-reducing guide step.

4. The coil molding method according to claim 3, wherein the extension guide step maintains guidance over an extension length capable of abutting at least a pair of the straight portions linking to each of the side ends of the band-shaped coil.

* * * * *